US012726708B2

(12) United States Patent
Ishida et al.

(10) Patent No.: US 12,726,708 B2
(45) Date of Patent: Sep. 1, 2026

(54) IMAGE CAPTURING FUNCTION CONTROL SYSTEM AND IMAGE CAPTURING FUNCTION CONTROL METHOD

(71) Applicant: KOBELCO CONSTRUCTION MACHINERY CO., LTD., Hiroshima (JP)

(72) Inventors: Daiki Ishida, Hiroshima (JP); Ryota Hama, Hiroshima (JP); Seiji Saiki, Tokyo (JP); Yoichiro Yamazaki, Tokyo (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 386 days.

(21) Appl. No.: 17/591,744

(22) Filed: Feb. 3, 2022

(65) Prior Publication Data

US 2022/0303472 A1 Sep. 22, 2022

(30) Foreign Application Priority Data

Mar. 19, 2021 (JP) ................................ 2021-045532

(51) Int. Cl.
*H04N 23/695* (2023.01)
*E02F 3/32* (2006.01)
(Continued)

(52) U.S. Cl.
CPC ........... *H04N 23/695* (2023.01); *E02F 3/435* (2013.01); *E02F 9/265* (2013.01); *H04N 23/66* (2023.01); *E02F 3/32* (2013.01)

(58) Field of Classification Search
CPC ... E02F 3/435; E02F 9/265; E02F 3/32; E02F 9/0858; E02F 9/123; E02F 9/205;
(Continued)

(56) References Cited

U.S. PATENT DOCUMENTS 10,590,628 B2 3/2020 Ariga et al.
2006/0224280 A1* 10/2006 Flanigan ................ A63H 30/04 701/1
(Continued)

FOREIGN PATENT DOCUMENTS

EP 3 399 744 A1 11/2018
JP H08-020975 A 1/1996
JP 2018-021395 A 2/2018

OTHER PUBLICATIONS

Extended European search report dated Sep. 9, 2022 issued in the corresponding EP Patent Application No. 22158537.5.

*Primary Examiner* — Abby J Flynn
*Assistant Examiner* — Paulo Roberto Gonzalez Leite
(74) *Attorney, Agent, or Firm* — Carrier, Shende & Associates P.C.; Joseph P. Carrier; Jeffrey T. Gedeon

(57) ABSTRACT

A system or the like capable of improving convenience of recognizing a surrounding situation of a working machine for an operator by controlling an image capturing function of an actual machine image capturing device in an appropriate manner in consideration of a state of the working machine is provided. When a working machine 40 is in the first state, an operation of a panning switch SW1 and a tilting switch SW2 is stopped, a posture $\phi$ of the actual machine image capturing device 412 when the operation is restarted is limited to an initial posture $\phi$0. When the working machine 40 is in the second state, after the operation of the panning switch SW1 and the tilting switch SW2 is stopped, the posture $\phi$ of the actual machine image capturing device 412 when the operation is restarted is the posture $\phi$ as it is when the operation is stopped.

6 Claims, 7 Drawing Sheets

(51) Int. Cl.

| | |
|---|---|
| ***E02F 3/43*** | (2006.01) |
| ***E02F 9/26*** | (2006.01) |
| ***H04N 23/66*** | (2023.01) |

(58) Field of Classification Search

CPC ....... E02F 9/2033; E02F 9/261; E02F 9/2029; H04N 23/695; H04N 23/66

See application file for complete search history.

(56) References Cited

U.S. PATENT DOCUMENTS

| | | | | |
|---|---|---|---|---|
| 2017/0050563 | A1* | 2/2017 | Bosscher | G01S 3/781 |
| 2018/0051446 | A1* | 2/2018 | Yoshinada | E02F 9/264 |
| 2020/0208381 | A1* | 7/2020 | Minagawa | H04Q 9/00 |

* cited by examiner

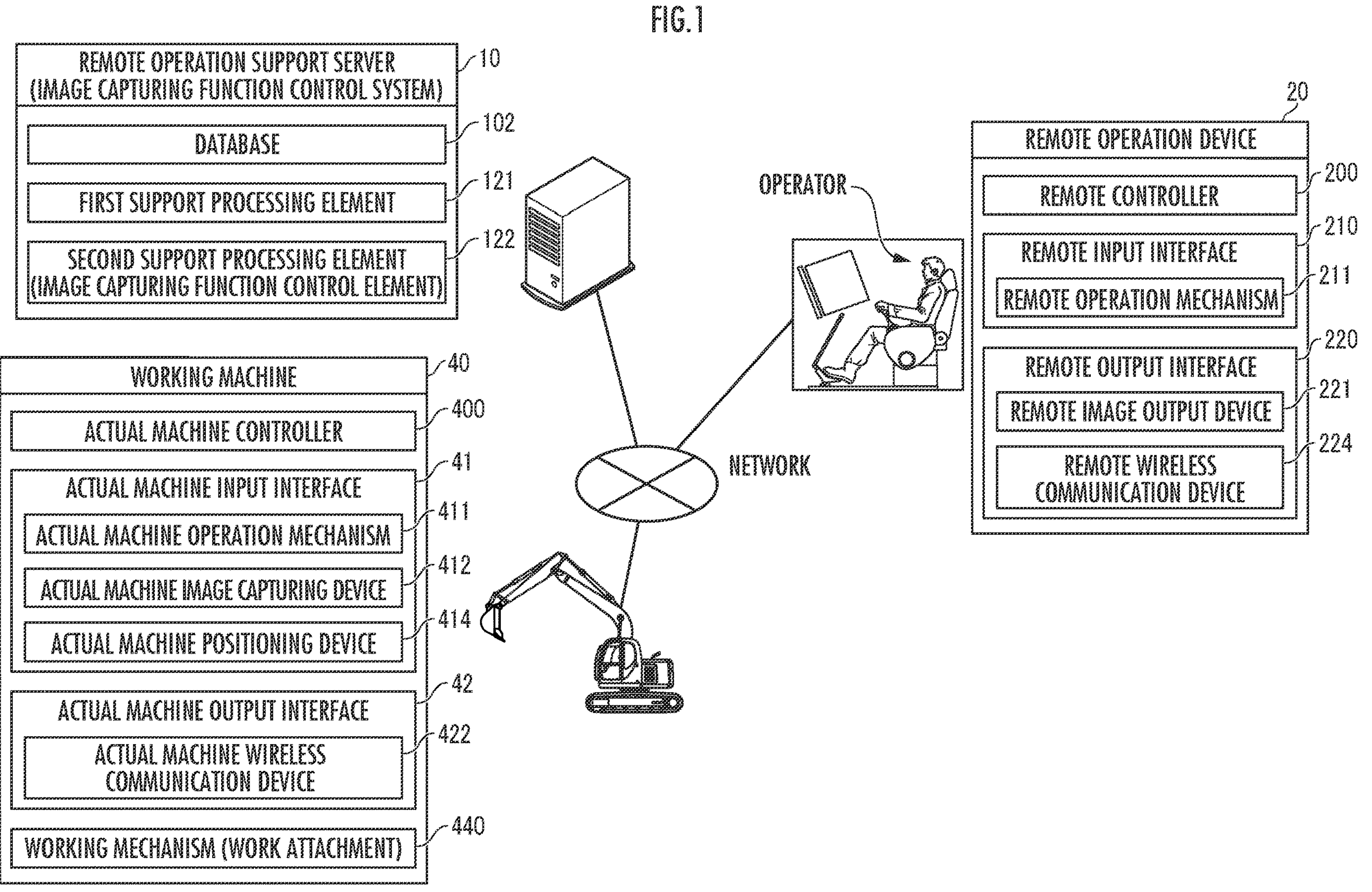
FIG. 1
REMOTE OPERATION SUPPORT SERVER (IMAGE CAPTURING FUNCTION CONTROL SYSTEM)
10
DATABASE
102
FIRST SUPPORT PROCESSING ELEMENT
121
SECOND SUPPORT PROCESSING ELEMENT (IMAGE CAPTURING FUNCTION CONTROL ELEMENT)
122
WORKING MACHINE
40
ACTUAL MACHINE CONTROLLER
400
ACTUAL MACHINE INPUT INTERFACE
41
ACTUAL MACHINE OPERATION MECHANISM
411
ACTUAL MACHINE IMAGE CAPTURING DEVICE
412
ACTUAL MACHINE POSITIONING DEVICE
414
ACTUAL MACHINE OUTPUT INTERFACE
42
ACTUAL MACHINE WIRELESS COMMUNICATION DEVICE
422
WORKING MECHANISM (WORK ATTACHMENT)
440
OPERATOR
NETWORK
20
REMOTE OPERATION DEVICE
REMOTE CONTROLLER
200
REMOTE INPUT INTERFACE
210
REMOTE OPERATION MECHANISM
211
REMOTE OUTPUT INTERFACE
220
REMOTE IMAGE OUTPUT DEVICE
221
REMOTE WIRELESS COMMUNICATION DEVICE
224

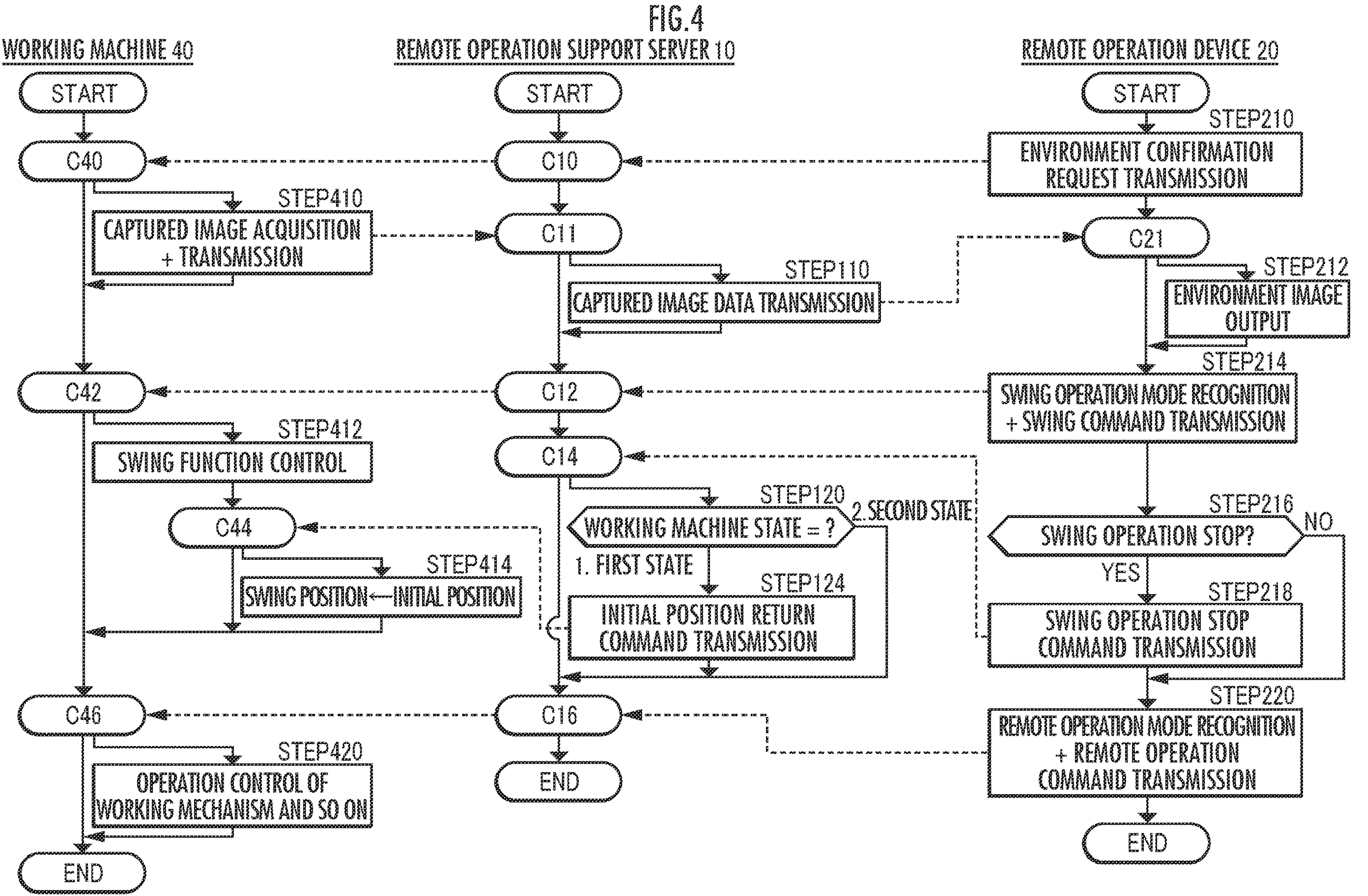
FIG.4
WORKING MACHINE 40
REMOTE OPERATION SUPPORT SERVER 10
REMOTE OPERATION DEVICE 20
START
C40
STEP410
CAPTURED IMAGE ACQUISITION + TRANSMISSION
C42
STEP412
SWING FUNCTION CONTROL
C44
STEP414
SWING POSITION←INITIAL POSITION
C46
STEP420
OPERATION CONTROL OF WORKING MECHANISM AND SO ON
END
START
C10
C11
STEP110
CAPTURED IMAGE DATA TRANSMISSION
C12
C14
STEP120
WORKING MACHINE STATE = ?
1. FIRST STATE
2. SECOND STATE
STEP124
INITIAL POSITION RETURN COMMAND TRANSMISSION
C16
END
START
STEP210
ENVIRONMENT CONFIRMATION REQUEST TRANSMISSION
C21
STEP212
ENVIRONMENT IMAGE OUTPUT
STEP214
SWING OPERATION MODE RECOGNITION + SWING COMMAND TRANSMISSION
STEP216
SWING OPERATION STOP?
YES
NO
STEP218
SWING OPERATION STOP COMMAND TRANSMISSION
STEP220
REMOTE OPERATION MODE RECOGNITION + REMOTE OPERATION COMMAND TRANSMISSION
END ACTUAL MACHINE IMAGE CAPTURING DEVICE SWING POSITION
φ
INITIAL POSITION φ0
SECOND STATE
FIRST STATE
OPERATION START
ts
OPERATION STOP
t1
OPERATION RESTART
t2
OPERATION STOP
t3
TIME t

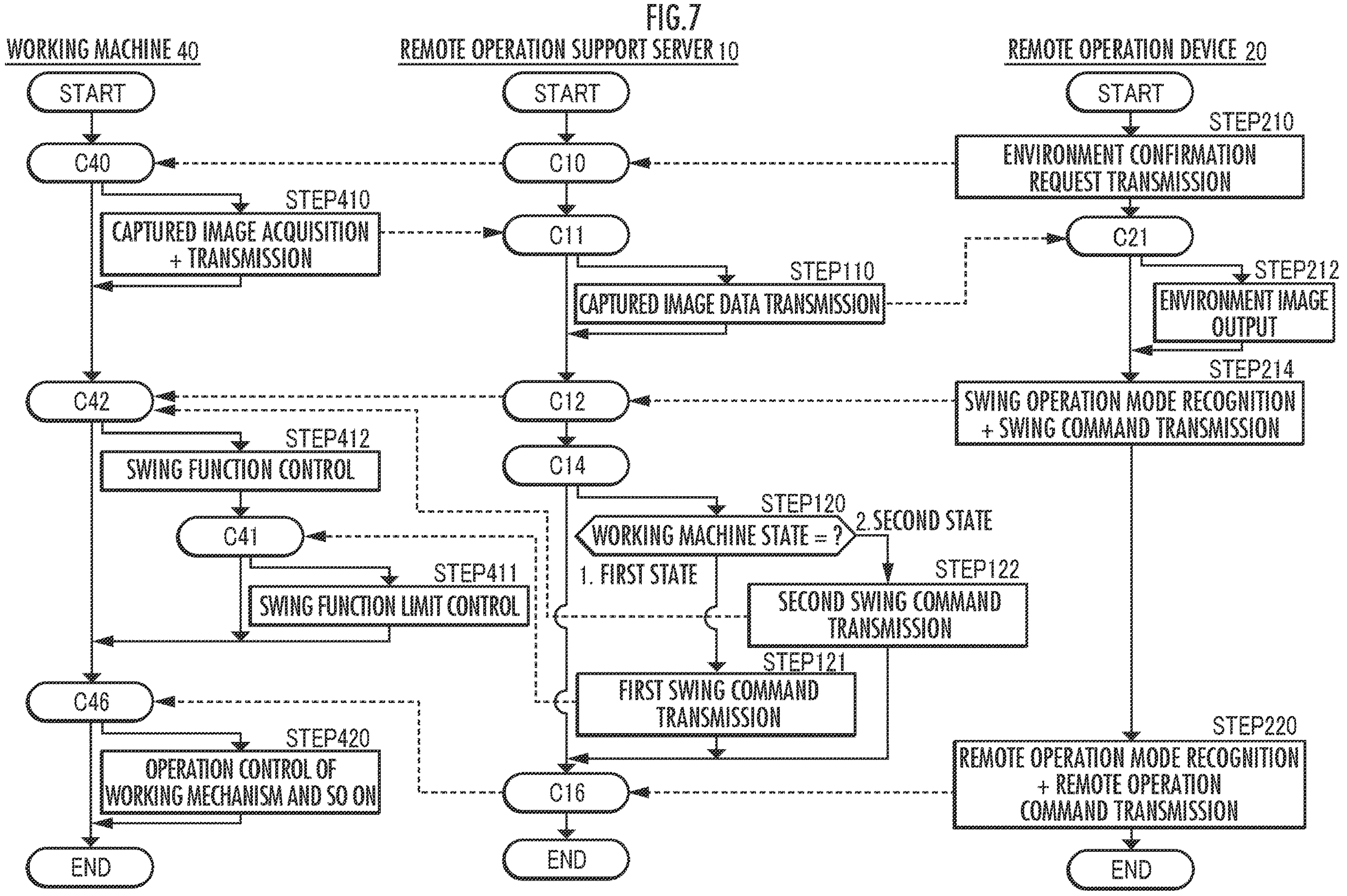
FIG.7
WORKING MACHINE 40
REMOTE OPERATION SUPPORT SERVER 10
REMOTE OPERATION DEVICE 20
START
C40
STEP410
CAPTURED IMAGE ACQUISITION + TRANSMISSION
C42
STEP412
SWING FUNCTION CONTROL
C41
STEP411
SWING FUNCTION LIMIT CONTROL
C46
STEP420
OPERATION CONTROL OF WORKING MECHANISM AND SO ON
END
C10
C11
STEP110
CAPTURED IMAGE DATA TRANSMISSION
C12
C14
STEP120
WORKING MACHINE STATE = ?
1. FIRST STATE
2. SECOND STATE
STEP122
SECOND SWING COMMAND TRANSMISSION
STEP121
FIRST SWING COMMAND TRANSMISSION
C16
STEP210
ENVIRONMENT CONFIRMATION REQUEST TRANSMISSION
C21
STEP212
ENVIRONMENT IMAGE OUTPUT
STEP214
SWING OPERATION MODE RECOGNITION + SWING COMMAND TRANSMISSION
STEP220
REMOTE OPERATION MODE RECOGNITION + REMOTE OPERATION COMMAND TRANSMISSION

IMAGE CAPTURING FUNCTION CONTROL SYSTEM AND IMAGE CAPTURING FUNCTION CONTROL METHOD

BACKGROUND OF THE INVENTION

Field of the Invention

The present invention relates to a technology of controlling an image capturing function of an actual machine image capturing device loaded on a working machine such as a hydraulic shovel.

Description of the Related Art

A technology that an operator operates a working machine using a remote operation device while referring to a remote image indicating a working situation of the working machine has been proposed (for example, see Japanese Patent Laid-Open No. 2018-021395). In a case where an operator remotely operates a working machine, a sensation when recognizing a situation around the working machine is different for the operator compared to the case where the operator gets on the working machine (actual machine) and operates the actual machine Therefore, in order that the operator variously change a looking direction and confirm the situation around the working machine similarly to the time of operating the actual machine, a system is configured to change a direction of an actual machine image capturing device loaded on the working machine.

However, in the case where a degree of freedom of a swing function of the actual machine image capturing device is extremely high or low, if it is forgotten to cancel setting of increasing a display magnification of a camera of the working machine or the display magnification of the camera is not completely returned to a minimum (initial) display magnification when a captured image acquired through the actual machine image capturing device changes, recognition of the surrounding situation is obstructed and the recognition of the surrounding situation needed to perform work becomes insufficient.

Therefore, an object of the present invention is to provide a system or the like capable of improving convenience of recognizing a surrounding situation of a working machine for an operator by controlling an image capturing function of an actual machine image capturing device loaded on the working machine in an appropriate manner in consideration of a state of the working machine.

SUMMARY OF THE INVENTION

An image capturing function control system of the present invention is a system that controls an image capturing function of an actual machine image capturing device, the actual machine image capturing device being loaded on a working machine and configured to acquire a captured image to be outputted to an output interface, a movement of the working machine being controlled according to an operation through an input interface,

- the system comprises an image capturing function control element configured to control a swing function as the image capturing function of the actual machine image capturing device according to a mode of a swing operation through the input interface, and
- the image capturing function control element limits the swing function as the image capturing function of the actual machine image capturing device in a first state which is a state where the working machine can be operated or a state where the working machine is working, compared to the swing function in a second state which is a state where the working machine cannot be operated or a state where the working machine is not working.

According to the image capturing function control system of the configuration, the swing function of the actual machine image capturing device is limited in the first state compared to the second state. The "swing function" means at least one of a panning function and a tilting function. That is, in the first state, compared to the second state, in the case where the actual machine image capturing device includes both of the panning function and the tilting function, at least one of the both functions is limited, and in the case where the actual machine image capturing device includes only one of the panning function and the tilting function, the one function is limited. As a result, a change amount of an actual spatial area projected to the output interface is suppressed, so that the situation that an operator is destructed and the operation of the working machine through the input interface is obstructed can be avoided in the first state.

BRIEF DESCRIPTION OF THE DRAWINGS

FIG. 1 is an explanatory diagram regarding a configuration of a remote operation support system;

FIG. 4 is an explanatory diagram regarding a function of the remote operation support system (image capturing function control system);

FIG. 7 is an explanatory diagram regarding the function of the remote operation support system (image capturing function control system) in another embodiment.

Figure 2:
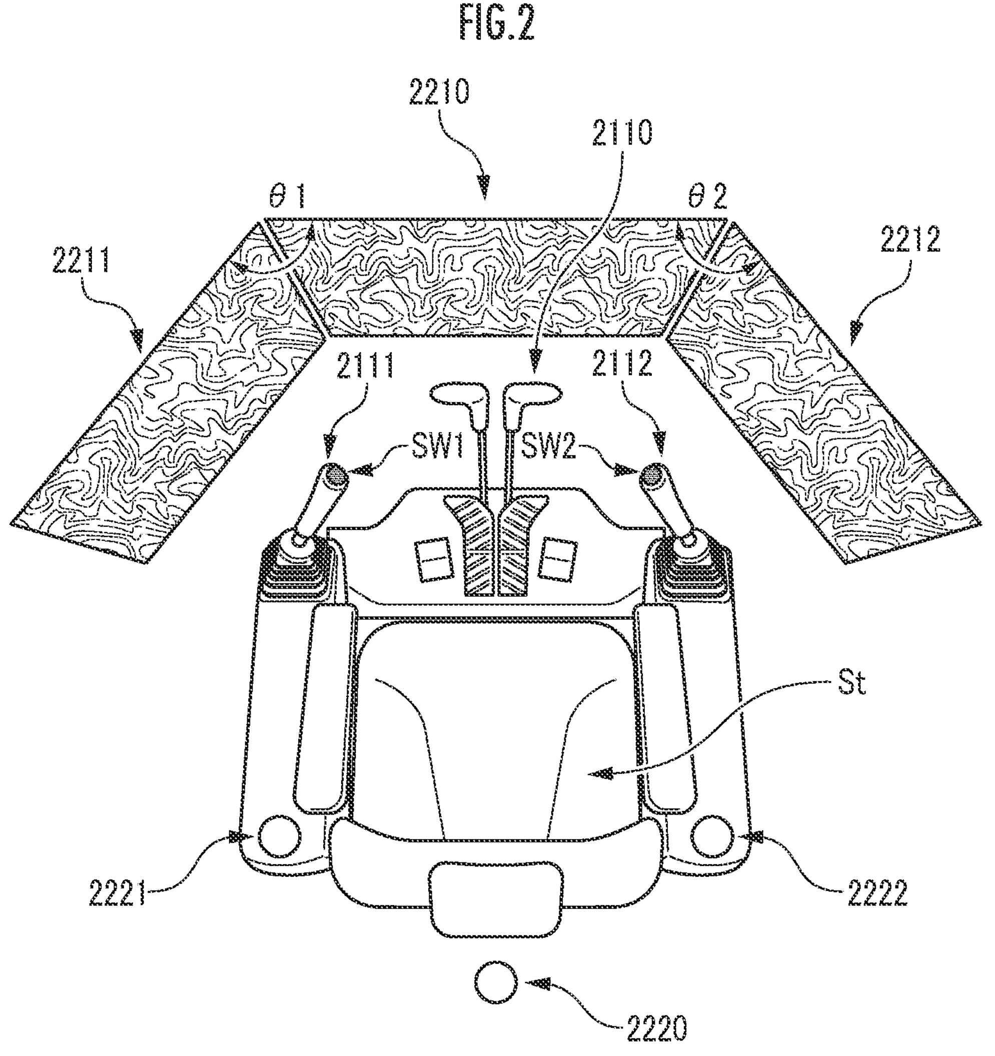
FIG. 2 is an explanatory diagram regarding a configuration of a remote operation device.

DETAILED DESCRIPTION OF THE PREFERRED EMBODIMENTS (Configuration of Remote Operation Support System)

The remote operation support system illustrated in FIG. 1 is configured by a remote operation support server 10, and a remote operation device 20 for remotely operating a working machine 40. The remote operation support server 10, the remote operation device 20 and the working machine 40 are configured such that network communication with each other is possible. An intercommunication network of the remote operation support server 10 and the remote operation device 20 and an intercommunication network of the remote operation support server 10 and the working machine 40 may be the same or may be different.

(Configuration of Remote Operation Support Server)

The remote operation support server 10 comprises a database 102, a first support processing element 121 and a second support processing element 122. The database 102 stores and holds captured image data or the like. The database 102 may be configured by a database server different from the remote operation support server 10. The individual support processing element is configured by an arithmetic processing unit (a single-core processor or a multicore processor or a processor core configuring it), reads required data and software from a storage device such as a memory, and executes arithmetic processing to be described later according to the software for the data. In the present embodiment, the remote operation support server 10 configures an "image capturing function control system" and the second support processing element 122 configures an "image capturing function control element".

(Configuration of Remote Operation Device)

The remote operation device 20 comprises a remote controller 200, a remote input interface 210 and a remote output interface 220. The remote controller 200 is configured by an arithmetic processing unit (a single-core processor or a multicore processor or a processor core configuring it), reads required data and software from a storage device such as a memory, and executes arithmetic processing according to the software for the data.

The remote input interface 210 comprises a remote operation mechanism 211. The remote output interface 220 comprises a remote image output device 221, a remote sound output device 222 and a remote wireless communication device 224.

The remote operation mechanism 211 includes an operation device for traveling, an operation device for turning, an operation device for a boom, an operation device for an arm and an operation device for a bucket. The individual operation device includes an operation lever which receives a rotary operation. The operation lever (traveling lever) of the operation device for traveling is operated to move a lower traveling body 410 of the working machine 40. The traveling lever may also serve as a traveling pedal. For example, the traveling pedal fixed to a base part or a lower end part of the traveling lever may be provided. The operation lever (turning lever) of the operation device for turning is operated to move a hydraulic turning motor configuring a turning mechanism 430 of the working machine 40. The operation lever (boom lever) of the operation device for the boom is operated to move a boom cylinder 442 of the working machine 40. The operation lever (arm lever) of the operation device for the arm is operated to move an arm cylinder 444 of the working machine 40. The operation lever (bucket lever) of the operation device for the bucket is operated to move a bucket cylinder 446 of the working machine 40.

The individual operation lever configuring the remote operation mechanism 211 is, for example, arranged around a seat St for an operator to sit, as illustrated in FIG. 2. The seat St is in a form like a high back chair with armrests but may be a sitting part in an arbitrary form that the operator can sit such as a form like a low back chair without a headrest or a form like a chair without a backrest.

At the front of the seat St, a pair of left and right traveling levers 2110 according to left and right crawlers are arranged side by side on left and right. One operation lever may serve as a plurality of operation levers. For example, a left side operation lever 2111 provided on the front of a left side frame of the seat St illustrated in FIG. 2 may function as the arm lever when operated in a front-back direction and function as the turning lever when operated in a left-right direction. Similarly, a right side operation lever 2112 provided on the front of a right side frame of the seat St illustrated in FIG. 2 may function as the boom lever when operated in the front-back direction and function as the bucket lever when operated in the left-right direction. A lever pattern may be arbitrarily changed by an operation instruction by the operator.

On a part to be held by the operator of each of the left side operation lever 2111 and the right side operation lever 2112, a panning switch SW1 and a tilting switch SW2 for respectively adjusting a panning angle and a tilting angle of an actual machine image capturing device 412 as described later are provided respectively. Both of the panning switch SW1 and the tilting switch SW2 may be provided on only one of the left side operation lever 2111 and the right side operation lever 2112. Each of the panning switch SW1 and the tilting switch SW2 is configured such that the operation posture is returned to an initial operation posture by an energizing element such as an actuator or a spring under a fixed condition. In the case where the actual machine image capturing device 412 has only one of a panning function and a tilting function as a swing function, one of the panning switch SW1 and the tilting switch SW2 may be omitted.

The remote image output device 221 is configured by a center remote image output device 2210, a left side remote image output device 2211 and a right side remote image output device 2212 each provided with a roughly rectangular screen and arranged respectively at the front, oblique left front and oblique right front of the seat St, as illustrated in FIG. 2 for example. Shapes and sizes of the respective screens (image display areas) of the center remote image output device 2210, the left side remote image output device 2211 and the right side remote image output device 2212 may be the same or may be different.

As illustrated in FIG. 2, a right edge of the left side remote image output device 2211 is adjacent to a left edge of the center remote image output device 2210 so that the screen of the center remote image output device 2210 and the screen of the left side remote image output device 2211 form an inclination angle θ1 (for example, 120°≤150°). As illustrated in FIG. 2, a left edge of the right side remote image output device 2212 is adjacent to a right edge of the center remote image output device 2210 so that the screen of the center remote image output device 2210 and the screen of the right side remote image output device 2212 form an inclination angle θ2 (for example, 120°≤150°). The inclination angles θ1 and θ2 may be the same or may be different.

The respective screens of the center remote image output device 2210, the left side remote image output device 2211 and the right side remote image output device 2212 may be parallel to a vertical direction or may be inclined to the vertical direction. At least one image output device of the center remote image output device 2210, the left side remote image output device 2211 and the right side remote image output device 2212 may be configured by a plurality of divided image output devices. For example, the center remote image output device 2210 may be configured by a pair of image output devices which are provided with roughly rectangular screens and are adjacent up and down.

The remote sound output device 222 is configured by one or more speakers, and is configured by a center sound output device 2220, a left side sound output device 2221 and a right side sound output device 2222 arranged respectively at the back of the seat St, a left armrest rear part and a right armrest rear part. Respective specifications of the center sound output device 2220, the left side sound output device 2221 and the right side sound output device 2222 may be the same or may be different.

(Configuration of Working Machine)

The working machine 40 comprises an actual machine controller 400, an actual machine input interface 41, an actual machine output interface 42 and a working mechanism 440. The actual machine controller 400 comprises an image processor 30. The image processor 30 comprises a state detection element 31, an image prediction element 32 and an image compression element 34. Each of components of the actual machine controller 400 and the image processor 30 is configured by an arithmetic processing unit (a single-core processor or a multicore processor or a processor core configuring it), reads required data and software from a storage device such as a memory, and executes arithmetic processing according to the software for the data.

Figure 3:
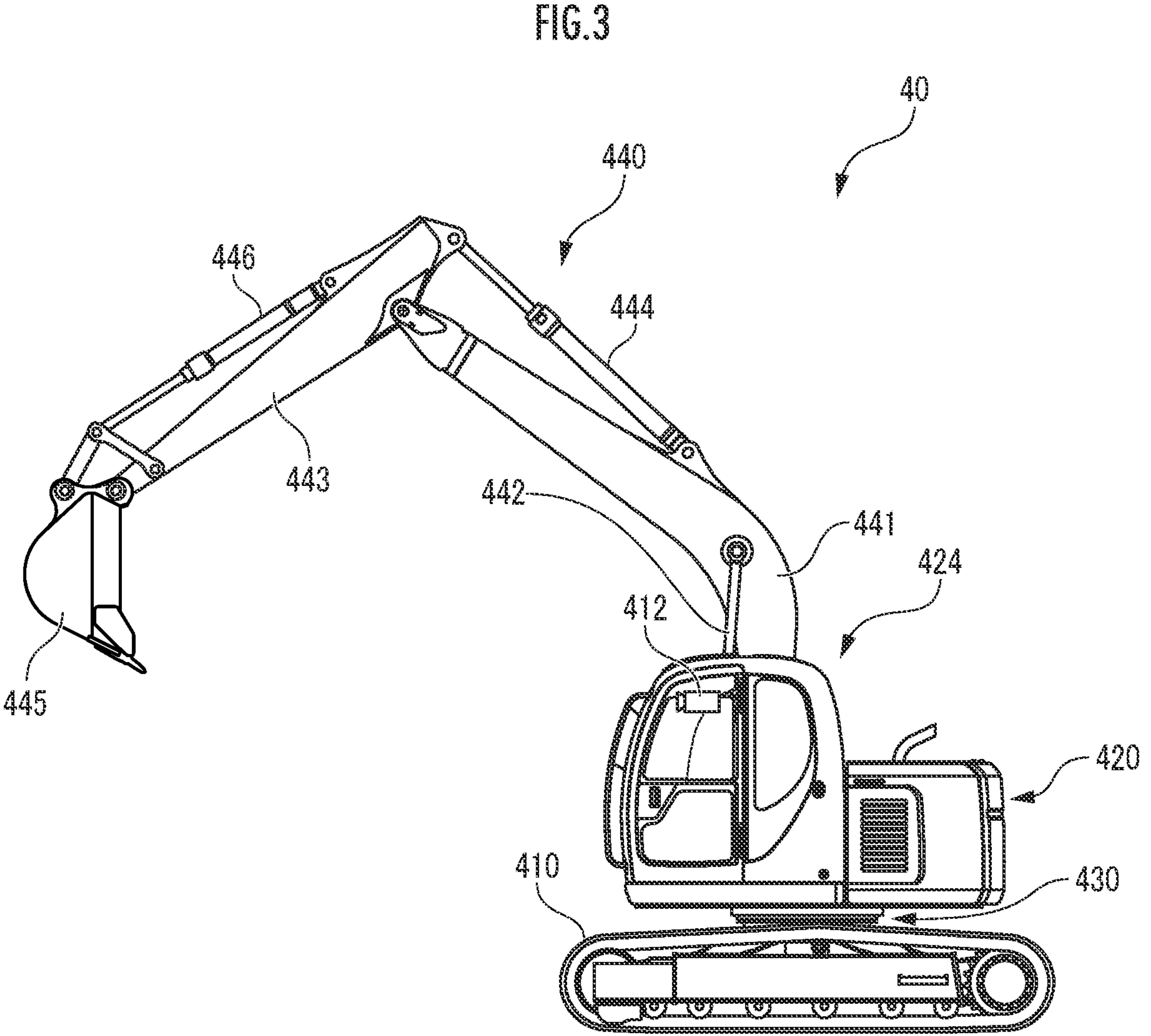
FIG. 3 is an explanatory diagram regarding a configuration of a working machine.

The working machine 40 is a crawler shovel (construction machine) for example, and as illustrated in FIG. 3, comprises the crawler type lower traveling body 410 and an upper turning body 420 loaded on the lower traveling body 410 so as to be turned via the turning mechanism 430. On a front left side part of the upper turning body 420, a cab 424 (driver's cab) is provided. On a front center part of the upper turning body 420, the working mechanism 440 is provided.

The actual machine input interface 41 comprises an actual machine operation mechanism 411, the actual machine image capturing device 412 and a positioning device 414. The actual machine operation mechanism 411 comprises a plurality of operation levers arranged similarly to the remote operation mechanism 211 around a seat arranged inside the cab 424. The cab 424 comprises a drive mechanism or a robot which receives signals according to an operation mode of a remote operation lever and moves an actual machine operation lever based on the received signals. The actual machine image capturing device 412 is installed inside the cab 424 for example, and images an environment including at least a part of the working mechanism 440 over a front window and a pair of left and right side windows. Some or all of the front window and the side windows may be omitted. The positioning device 414 is configured by a GPS and a gyro sensor or the like as needed.

The actual machine output interface 42 comprises an actual machine wireless communication device 422.

As illustrated in FIG. 3, the working mechanism 440 as a working mechanism comprises a boom 441 mounted on the upper turning body 420 so as to be raised and lowered, an arm 443 rotatably connected to a distal end of the boom 441, and a bucket 445 rotatably connected to the distal end of the arm 443. The working mechanism 440 is mounted with the boom cylinder 442, the arm cylinder 444 and the bucket cylinder 446 each configured by an extendable hydraulic cylinder.

The boom cylinder 442 is interposed between the boom 441 and the upper turning body 420 so as to be extended and contracted by receiving supply of hydraulic oil and rotate the boom 441 in a raising/lowering direction. The arm cylinder 444 is interposed between the arm 443 and the boom 441 so as to be extended and contracted by receiving the supply of the hydraulic oil and rotate the arm 443 around a horizontal axis to the boom 441. The bucket cylinder 446 is interposed between the bucket 445 and the arm 443 so as to be extended and contracted by receiving the supply of the hydraulic oil and rotate the bucket 445 around the horizontal axis to the arm 443.

(Functions)

The functions of the remote operation support system and the image capturing function control system of the configuration described above will be described using a flowchart illustrated in FIG. 4. In the flowchart, a block of "C•" is used for description simplification, means transmission and/or reception of data, and means conditional branching that processing in a branching direction is executed on condition that the data is transmitted and/or received.

In the remote operation device 20, an environment confirmation request is transmitted to the remote operation support server 10 through the remote wireless communication device 224 (FIG. 4/STEP210). For example, a specifying operation performed through the remote input interface 210 by an operator may be determined as a transmission start requirement of the environment confirmation request. The "specifying operation" is, for example, an operation of tapping or the like in the remote input interface 210 for specifying the working machine 40 that the operator intends to remotely operate.

In the remote operation support server 10, in the case where the environment confirmation request is received, the environment confirmation request is transmitted to the corresponding working machine 40 by the first support processing element 121 (FIG. 4/C10).

In the working machine 40, in the case where the environment confirmation request is received through the actual machine wireless communication device 422 (FIG. 4/C40), a captured image is acquired through the actual machine image capturing device 412 by the actual machine controller 400, and captured image data indicating the captured image is transmitted to the remote operation support server 10 through the actual machine wireless communication device 422 (FIG. 4/STEP410).

In the remote operation support server 10, in the case where the captured image data is received by the first support processing element 121 (FIG. 4/C11), environment image data according to the captured image is transmitted to the remote operation device 20 by the second support processing element 122 (FIG. 4/STEP110). The environment image data is image data indicating a simulated environment image generated based on the captured image other than the captured image data itself.

In the remote operation device 20, in the case where the environment image data is received through the remote wireless communication device 224 (FIG. 4/C21), the environment image according to the environment image data is outputted to the remote image output device 221 by the remote controller 200 (FIG. 4/STEP212).

Figure 5:
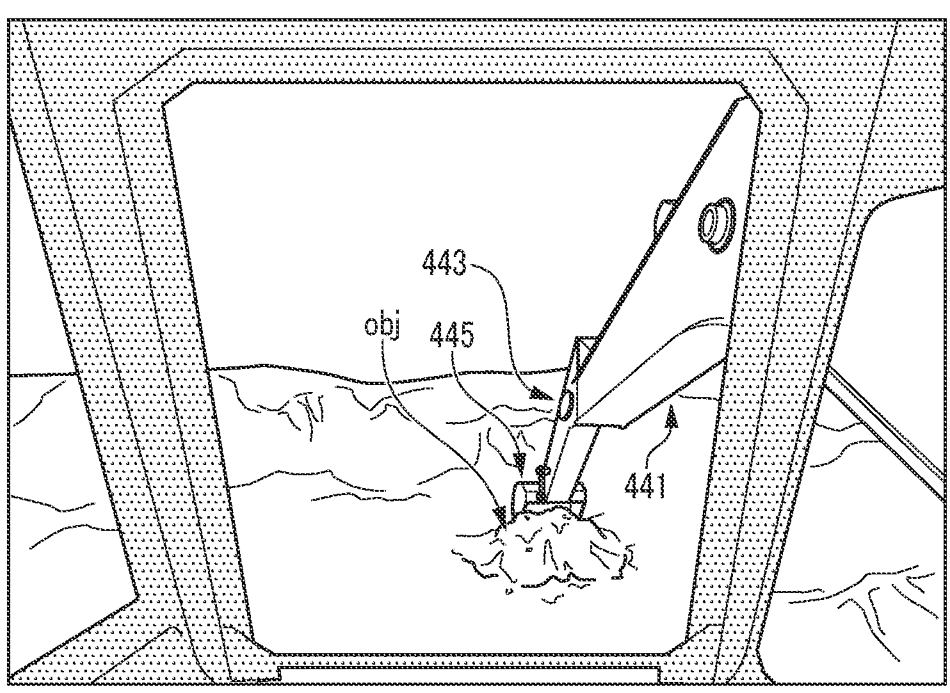
FIG. 5 is an explanatory diagram regarding a work environment image.

Thus, for example, as illustrated in FIG. 5, the environment image projecting the boom 441 and the arm 443 which are a part of the working mechanism 440 and a heap of rubble or earth and sand (which is a working object by the bucket 445) at the front of the cab 424 through a window frame demarcating the cab 424 is outputted to the remote image output device 221.

In the remote operation device 20, a swing operation mode of the remote operation mechanism 211 is recognized by the remote controller 200, and a swing command according to the swing operation mode is transmitted to the remote operation support server 10 through the remote wireless communication device 224 (FIG. 4/STEP214). The swing operation mode is specified by the respective operation postures of the panning switch SW1 and the tilting switch SW2 provided on respective holding parts of the left side operation lever 2111 and the right side operation lever 2112 (see FIG. 2). Each of the switches SW1 and SW2 is, for example, a slide switch or a lever type switch the operation posture (operation amount) of which is detectable, the operation amount to one side and the other side of the switch is detected, and a neutral position is attained in the case where no operation is performed.

According to an arbitrary operation posture $\theta_p$ in an operation posture range $[\theta_{p1},\theta_{p2}]$ of the panning switch SW1, the swing command for controlling a panning angle $\phi_p$ of the actual machine image capturing device 412 to a panning angle $f_p(\theta_p)$ in a panning angle range $[\phi_{p1},\phi_{p2}]$ is generated. A function $f_p$ is defined by a relational expression (01), for example.

$$f_p(\theta_p)=\{(\phi_{p2}-\phi_{p1})/(\theta_{p2}-\theta_{p1})\}(\theta_p-\theta_{p1})-\phi_{p1} \quad (01)$$

According to an arbitrary operation posture $\theta_t$ in an operation posture range $[\theta_{t1},\theta_{t2}]$ of the tilting switch SW2, the swing command for controlling a tilting angle $\phi_t$ of the actual machine image capturing device 412 to a tilting angle $f_t(\theta_t)$ in a tilting angle range $[\phi_{t1},\phi_{t2}]$ is generated. A function $f_t$ is defined by a relational expression (02), for example.

$$f_t\{(\phi_{t2}-\phi_{t1})/(\theta_{t2}-\theta_{t1})\}(\theta_t-\theta_{t1})+\phi_{t1} \quad (02)$$

In the remote operation support server 10, in the case where the swing command is received, the swing command is transmitted to the working machine 40 by the second support processing element 122 (image capturing function control element) (FIG. 4/C12).

In the working machine 40, in the case where a normal swing command is received through the actual machine wireless communication device 422 (FIG. 4/C42), the swing function (to be exact, a panning drive mechanism and/or a tilting drive mechanism provided in the actual machine image capturing device 412) of the actual machine image capturing device 412 is controlled by the actual machine controller 400 and the panning angle $\phi_p$ and/or the tilting angle $\phi_t$ is adjusted (FIG. 4/STEP412).

Thus, an actual spatial area projected in not only the captured image acquired through the actual machine image capturing device 412 but also the environment image outputted in the remote image output device 221 is changed (FIG. 4/STEP410→ . . . →STEP212, see FIG. 5). For example, in the case where an optical axis direction is changed from the front of the working machine 40 to the oblique left front by the control of the panning angle $\phi_p$ of the actual machine image capturing device 412, the actual spatial area projected in the environment image is changed from a front area of the working machine 40 to an oblique left front area. In addition, in the case where the optical axis direction is changed from a front horizontal direction to a front oblique lower part by the control of the tilting angle $\phi_t$ of the actual machine image capturing device 412, the actual spatial area projected in the environment image is changed to an area lower than before.

In the remote operation device 20, presence/absence of a stop of a swing operation is determined by the remote controller 200 (FIG. 4/STEP216). For example, whether or not the swing operation is stopped is determined according to whether or not the state where the change amount of the respective operation postures of the panning switch SW1 and the tilting switch SW2 is a threshold or smaller (the state where the panning switch SW1 and the tilting switch SW2 are not operated respectively) has continued over a specified period.

In the case where the determination result is affirmative (FIG. 4/STEP216 . . . YES), by the remote controller 200, a swing stop command is transmitted to the remote operation support server 10 (FIG. 4/STEP218). On the other hand, in the case where the determination result is negative (FIG. 4/STEP216 . . . NO), the swing stop command is not generated and following processing is executed.

In the remote operation support server 10, in the case where the swing stop command is received (FIG. 4/C14), by the second support processing element 122, the state of the working machine 40 is determined based on a communication result with the working machine 40 (FIG. 4/STEP120). A "first state" is a state where the working machine 40 can be operated (or a state where the working machine 40 is working). A "second state" is a state where the working machine 40 cannot be operated (or a state where the working machine 40 is not working). For example, the first state and the second state of the working machine 40 may be discriminated according to whether or not a hydraulic shut-off lever configuring the actual machine operation mechanism 411 of the working machine 40 is in a predetermined posture. In addition, the first state and the second state of the working machine 40 may be discriminated according to whether or not a remote hydraulic shut-off lever simulating the hydraulic shut-off lever as a remote input interface is in a predetermined posture.

In the case where it is determined that the working machine 40 is in the first state (FIG. 4/STEP120 . . . 1), by the second support processing element 122, an initial posture return command is transmitted to the working machine 40 (FIG. 4/STEP124). On the other hand, in the case where it is determined that the working machine 40 is in the second state (FIG. 4/STEP120 . . . 2), the initial posture return command is not generated and the following processing is executed.

In the working machine 40, in the case where the initial posture return command is received through the actual machine wireless communication device 422 (FIG. 4/C44), the swing function of the actual machine image capturing device 412 is controlled by the actual machine controller 400 and the panning angle $\phi_p$ and/or the tilting angle $\phi_t$ is adjusted to an initial angle or an initial posture (FIG. 4/STEP414).

Figure 6:
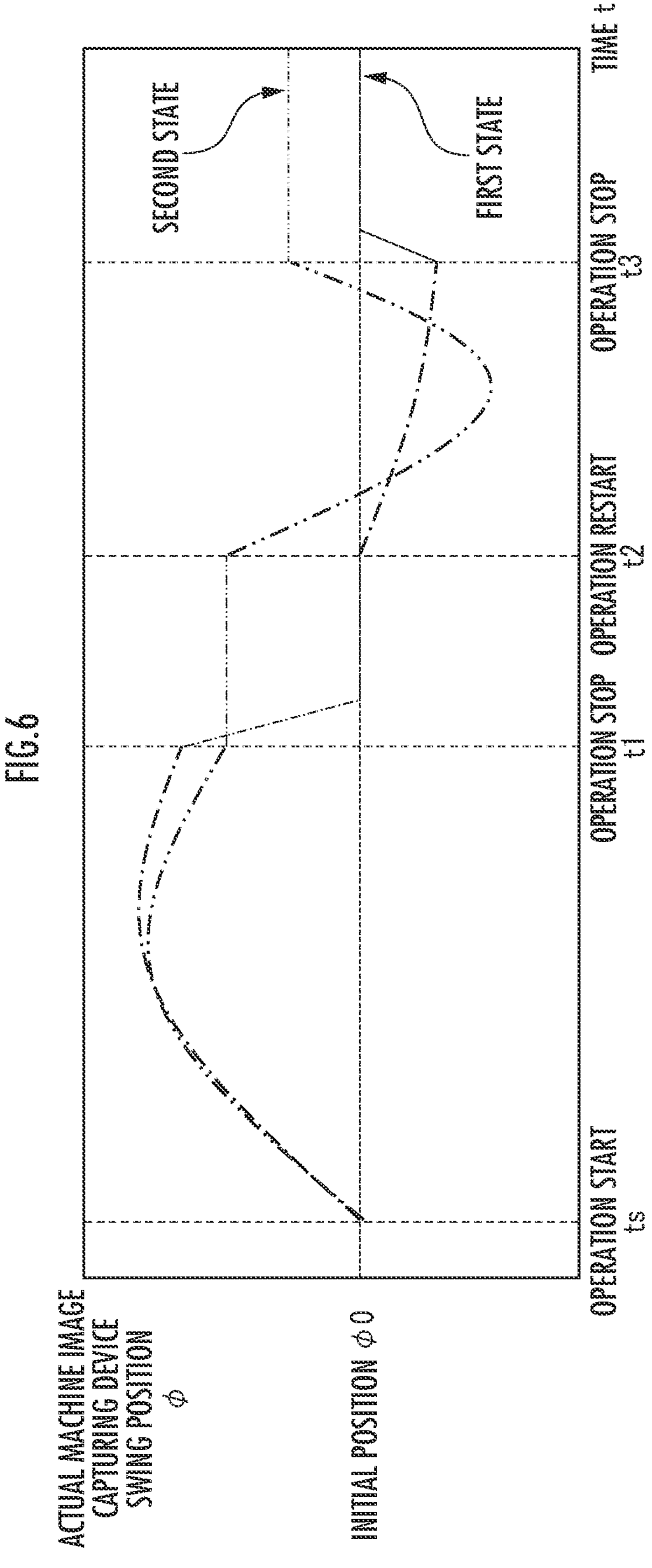
FIG. 6 is an explanatory diagram regarding a control mode of a swing function of an actual machine image capturing device.

For example, as illustrated in FIG. 6, the case where the swing operation is started at the time $t=t_s$, the swing operation is stopped at the time $t=t_0$, the swing operation is restarted at the time $t=t_1$, and the swing operation is stopped at the time $t=t_2$ is considered.

In this case, when the state of the working machine 40 is the first state, as illustrated by a dashed line in FIG. 6, the posture $\phi=(\phi_p,\phi_t)$ of the actual machine image capturing device 412 is controlled so as to be returned to an initial posture $\phi$ at the time $t=t_0$, changed according to the operation mode of the panning switch SW1 and/or the tilting switch SW2 from the time $t=t_1$, and then returned to the initial posture $\phi_0$ again at the time $t=t_2$. Therefore, the operator adjusts the posture $\phi$ of the actual machine image capturing device 412 from the initial posture $\phi_0$ by operation start of the panning switch SW1 and/or the tilting switch SW2 at the time $t=t_1$. The initial posture return command may be transmitted to the remote operation device 20 by the second support processing element 122 so that each operation posture $\theta$ of the panning switch SW1 and the tilting switch SW2 is returned to the initial operation posture $\theta_0$ as the posture $\phi$ of the actual machine image capturing device 412 is returned to the initial posture $\phi_0$.

On the other hand, when the state of the working machine 40 is the second state, as illustrated by a two-dot chain line in FIG. 6, the posture $\phi=(\phi_p,\phi_t)$ of the actual machine image capturing device 412 is controlled so as to be maintained to be the posture $\phi(t_1)$ as it is at the time $t=t_0$, changed according to the operation mode of the panning switch SW1 and/or the tilting switch SW2 from the time $t=t_1$, and then maintained to be the posture $\phi(t_2)$ as it is at the time $t=t_2$. Therefore, the operator adjusts the posture $\phi$ of the actual machine image capturing device 412 from the posture $\phi(t_0)$ when the operation is stopped last time, by operation restart of the panning switch SW1 and/or the tilting switch SW2 at the time $t=t_1$.

In the remote operation device 20, the operation mode of the remote operation mechanism 211 is recognized by the remote controller 200, and a remote operation command according to the operation mode is transmitted to the remote operation support server 10 through the remote wireless communication device 224 (FIG. 4/STEP220).

In the remote operation support server 10, in the case where the remote operation command is received by the second support processing element 122, the remote operation command is transmitted to the working machine 40 by the first support processing element 121 (FIG. 4/C16).

In the working machine 40, in the case where the operation command is received through the actual machine wireless communication device 422 by the actual machine controller 400 (FIG. 4/C46), a movement of the working mechanism 440 or the like is controlled (FIG. 4/STEP420). For example, work of scooping soil at the front of the working machine 40 by the bucket 445, turning the upper turning body 420 and then dropping the soil from the bucket 445 is executed.

(Effects)

According to the image capturing function control system configuring the remote operation support system of the configuration described above, in the first state compared to the second state, the swing function of the actual machine image capturing device 412 is limited (FIG. 4/STEP120 . . . 1→STEP124→C44→STEP414, see FIG. 6).

For details, in the case where the working machine 40 is in the first state, after the operation of the panning switch SW1 and the tilting switch SW2 is stopped, the posture of the actual machine image capturing device 412 when the operation is restarted is limited to the initial posture $\phi_0$. As a result, after the operator is made to recognize the situation of the actual spatial area according to the posture when the swing operation of the actual machine image capturing device is stopped, the operator can be made to recognize the situation of the actual spatial area according to the initial posture of the actual machine image capturing device without requiring the swing operation through the remote input interface 210 (the panning switch SW1 and/or the tilting switch SW2) by the operator.

On the other hand, in the case where the working machine 40 is in the second state, after the operation of the panning switch SW1 and the tilting switch SW2 is stopped, the posture $\phi$ of the actual machine image capturing device 412 when the operation is restarted is the posture $\phi$ as it is when the operation is stopped last time. As a result, the actual machine image capturing device 412 is made to demonstrate the swing function according to an arbitrary swing operation mode through the remote input interface 210 (the panning switch SW1 and/or the tilting switch SW2) by the operator in a period during which the working machine 40 is not operated, and the operator can be made to recognize the situation of the actual spatial area projected in the captured image acquired through the actual machine image capturing device 412.

Other Embodiments of Present Invention

While the image capturing function control system is configured by the remote operation support server 10 and the image capturing function control element is configured by the second support processing element 122 in the embodiment described above, as another embodiment, the image capturing function control system may be configured by the working machine 40 and/or the remote operation device 20 and the image capturing function control element may be configured by the actual machine controller 400 and/or the remote controller 200.

While the swing function is limited by limiting the posture of the actual machine image capturing device 412 when the swing operation is restarted in the remote operation device 20 in the first state compared to the second state in the embodiment described above, as another embodiment, the swing function may be limited by limiting an adjustment width and/or a change speed of the posture of the actual machine image capturing device 412.

In this case, a series of the processing may be executed according to a flowchart illustrated in FIG. 7 instead of the flowchart illustrated in FIG. 4. In the flowchart, the block of "C•" is used for the description simplification, means the transmission and/or the reception of the data, and means the conditional branching that the processing in the branching direction is executed on condition that the data is transmitted and/or received. In FIG. 7, for the processing in common with FIG. 4, same signs are used and the description is omitted.

In the remote operation support server 10, in the case where the swing command is received (FIG. 7/C13), the state of the working machine 40 is determined based on a communication result with the working machine 40 by the second support processing element 122 (FIG. 7/STEP120). In the case where it is determined that the working machine 40 is in the "first state" (FIG. 7/STEP120 . . . 1), a first swing command is transmitted to the working machine 40 by the second support processing element 122 (FIG. 7/STEP121). On the other hand, in the case where it is determined that the working machine 40 is in the "second state" (FIG. 7/STEP120 . . . 2), a second swing command is transmitted to the working machine 40 by the second support processing element 122 (FIG. 7/STEP122).

In the working machine 40, in the case where the second swing command is received through the actual machine wireless communication device 422 (FIG. 7/C42), the swing function of the actual machine image capturing device 412 is controlled in a normal mode according to the operation mode of the panning switch SW1 and/or the tilting switch SW2 by the actual machine controller 400, and the panning angle $\phi_p$ and/or the tilting angle $\phi_t$ is adjusted (FIG. 7/STEP412). On the other hand, in the working machine 40, in the case where the first swing command is received through the actual machine wireless communication device 422 (FIG. 7/C41), the swing function of the actual machine image capturing device 412 is controlled in a mode limited compared to the normal mode though according to the operation mode of the panning switch SW1 and/or the tilting switch SW2 by the actual machine controller 400 (FIG. 7/STEP411). At the time, compared to the case where the working machine 40 is in the first state, the swing function is limited by limiting the adjustment width and/or the change speed of the posture of the actual machine image capturing device 412.

In the first state, when the swing operation is stopped (see the time $t=t_0$ and $t=t_2$ in FIG. 6), the captured image or the environment image acquired through the actual machine image capturing device 412 may be intermittently outputted to the remote output interface 220 or the captured image when the swing operation is stopped may be continuously outputted to the remote output interface 220, until the posture $\phi$ of the actual machine image capturing device 412 is returned to the predetermined initial posture $\phi_0$. As a result, an uncomfortable feeling of the operator due to change of the captured image or the environment image even though the swing operation is stopped can be reduced.

In the first state, when the swing operation through the remote input interface 210 (the panning switch SW1 and/or the tilting switch SW2) is inputted, a position and/or posture of the actual machine image capturing device 412 may be controlled to a predetermined using position and/or using posture by the demonstration of the swing function. Thus, in parallel with the work by the working machine 40, the operator can easily perform the swing operation.

In the image capturing function control system of the configuration described above, it is preferable that the image capturing function control element returns the posture of the actual machine image capturing device to the predetermined initial posture by the demonstration of the swing function when the swing operation through the input interface is stopped in the first state, and maintains the posture of the actual machine image capturing device as it is when the swing operation through the input interface is stopped in the second state.

According to the image capturing function control system of the configuration, in the case where the swing operation is stopped in the first state, the posture of the actual machine image capturing device is returned to the initial posture. As a result, after the operator is made to recognize the situation of the actual spatial area according to the posture when the swing operation of the actual machine image capturing device is stopped, the operator can be made to recognize the situation of the actual spatial area according to the initial posture of the actual machine image capturing device without requiring the swing operation through the input interface by the operator. On the other hand, in the case where the swing operation is stopped in the second state, the posture of the actual machine image capturing device is maintained as it is. As a result, the actual machine image capturing device is made to demonstrate the swing function according to the arbitrary swing operation mode through the input interface by the operator in the period during which the working machine is not operated, and the operator can be made to recognize the situation of the actual spatial area projected in the captured image acquired through the actual machine image capturing device.

In the image capturing function control system of the configuration described above, it is preferable that, when the swing operation through the input interface is stopped in the first state, the image capturing function control element makes the captured image acquired through the actual machine image capturing device be intermittently outputted to the output interface or makes the captured image when the swing operation is stopped be continuously outputted to the output interface, until the posture of the actual machine image capturing device is returned to the predetermined initial posture.

According to the image capturing function control system of the configuration, in the case where the swing operation through the input interface is stopped in the first state, the captured image when the posture of the actual machine image capturing device is returned to the initial posture is intermittently outputted through the output interface (or the captured image when the operation is stopped is continuously outputted). As a result, the uncomfortable feeling of the operator due to the change of the captured image even though the swing operation has been stopped can be reduced.

In the image capturing function control system of the configuration described above, it is preferable that, when the swing operation through the input interface is inputted in the first state, the image capturing function control element causes the posture of the actual machine image capturing device to be a predetermined using posture by the demonstration of the swing function.

According to the image capturing function control system of the configuration, in the first state, the posture of the actual machine image capturing device can be caused to be the predetermined using posture regardless of a magnitude of the operation amount of the swing operation through the input interface. Thus, the swing operation performed in parallel with the work by the working machine can be facilitated.

REFERENCE SIGNS LIST

10 . . . remote operation support server, 20 . . . remote operation device, 40 . . . working machine, 102 . . . database, 121 . . . first support processing element, 122 . . . second support processing element (image capturing function control element), 200 . . . remote controller, 210 . . . remote input interface, 211 . . . remote operation mechanism, 220 . . . remote output interface, 221 . . . remote image output device, 222 . . . remote sound output device, 400 . . . actual machine controller, 41 . . . actual machine input interface, 42 . . . actual machine output interface, 424 . . . cab (driver's cab), 440 . . . working mechanism, 445 . . . bucket (work part), SW1 panning switch, SW2 . . . tilting switch

What is claimed is:

1. An image capturing function control system that controls an image capturing function of an actual machine image capturing device, the actual machine image capturing device being loaded inside a working machine so that the image capturing device can image an environment including at least a part of the working mechanism over a front window of the working machine and a pair of left and right side windows of the working machine and configured to acquire a captured image to be outputted to an output interface of a remote operation device through which an operator can operate the working machine remotely, a movement of the working machine being controlled according to an operation through an input interface of the remote operation device, the system comprising an image capturing function control element configured to control a swing function as the image capturing function of the actual machine image capturing device according to a mode of a swing operation for operating an upper turning body of the working machine, the mode being input through the input interface, wherein the image capturing function control element automatically returns a posture of the actual machine image capturing device to a predetermined initial posture which captures the environment including at least the part of the work machine by demonstration of the swing function in a condition that the swing operation through the input interface of the remote operation device is stopped in a first state which is a state where the working machine can be operated or a state where the working machine is working, and maintains the posture of the actual machine image capturing device as it is when the swing operation through the input interface of the remote operation device is stopped in a second state which is a state where the working machine cannot be operated or a state where the working machine is not working.

2. The image capturing function control system according to claim 1, wherein, when the swing operation through the input interface is stopped in the first state, the image capturing function control element makes the captured image acquired through the actual machine image capturing device be intermittently outputted to the output interface or makes the captured image when the swing operation is stopped be continuously outputted to the output interface, until the posture of the actual machine image capturing device is returned to the predetermined initial posture.

3. The image capturing function control system according to claim 1, wherein, when the swing operation through the input interface is inputted in the first state, the image capturing function control element causes the posture of the actual machine image capturing device to be a predetermined using posture by demonstration of the swing function.

4. The image capturing function control system according to claim 1, wherein the image capturing function control element limits the swing function as the image capturing function of the actual machine image capturing device in the first state, compared to the swing function in the second state.

5. An image capturing function control method that controls an image capturing function of an actual machine image capturing device, the actual machine image capturing device being loaded inside a working machine so that the image capturing device can image an environment including at least a part of the working mechanism over a front window of the working machine and a pair of left and right side windows of the working machine and configured to acquire a captured image to be outputted to an output interface of a remote operation device through which an operator can operate the working machine remotely, a movement of the working machine being controlled according to an operation through an input interface of the remote operation device, the method comprising image capturing control processing, which is performed by an arithmetic processing unit, configured to control a swing function as the image capturing function of the actual machine image capturing device according to a mode of a swing operation for operating an upper turning body of the working machine, the mode being input through the input interface, wherein the image capturing control processing automatically returns a posture of the actual machine image capturing device to a predetermined initial posture which captures the environment including at least the part of the working machine by demonstration of the swing function in a condition that the swing operation through the input interface of the remote operation device is stopped in a first state which is a state where the working machine can be operated or a state where the working machine is working, and maintains the posture of the actual machine image capturing device as it is when the swing operation through the input interface of the remote operation device is stopped in a second state which is a state where the working machine cannot be operated or a state where the working machine is not working.

6. The image capturing function control method according to claim 5, wherein the image capturing control processing includes a process of limiting the swing function as the image capturing function of the actual machine image capturing device in the first state.

* * * * *